United States Patent Office 3,810,903
Patented May 14, 1974

3,810,903
PROCESS FOR THE PRODUCTION OF NITRILES
Juergen Luecke, Tubingen, Germany, assignor to Sandoz Ltd., Basel, Switzerland
No Drawing. Continuation-in-part of application Ser. No. 3,217, Jan. 15, 1970, now Patent No. 3,646,103, which is a continuation-in-part of application Ser. No. 807,914, Mar. 17, 1969, now Patent No. 3,663,589. This application Dec. 13, 1971, Ser. No. 207,600
Claims priority, application Great Britain, Mar. 18, 1969, 14,136/69; Germany, Mar. 22, 1969, P 19 14 688.4; Japan, Mar. 26, 1969, 44/22,457; France, Mar. 27, 1969, 69909116; Italy, Mar. 27, 1969, 14,710/69
Int. Cl. C07d 31/46
U.S. Cl. 260—294.9      8 Claims

ABSTRACT OF THE DISCLOSURE

Improvement in the production of nitriles by heating carboxylic acids or their functional derivatives with urea, which improvement consists in the additional use of amidosulphonic acid in the reaction mixture.

---

The present application is a continuation-in-part application of my copending application Ser. No. 3,217, filed Jan. 15, 1970, now U.S. Pat. 3,646,103, which in turn is a continuation-in-part of my earlier filed copending application Ser. No. 807,914, filed Mar. 17, 1969, now U.S. Pat. 3,663,589.

It is known to produce nitriles by reacting a mixture of a carboxylic acid or a functional derivative of a carboxylic acid and urea at a temperature superior to 250° C. It has been found that this reaction can be effected at lower temperatures and in shorter times when amidosulphonic acid (of formula $H_2N—SO_3H$) is added to the reaction mixture.

Carboxylic acids which can be converted into the corresponding nitriles by the aforementioned process include, e.g., the aliphatic carboxylic acids, in particular saturated aliphatic monocarboxylic acids having 2 to 10 carbon atoms, e.g. acetic, propionic, butyric, hexanecarboxylic and octanecarboxylic acids; the cycloaliphatic carboxylic acids, e.g. cyclohexanemonocarboxylic acid; especially suitable are mononuclear and binuclear aromatic monocarboxylic and dicarboxylic acids, e.g. benzenecarboxylic, naphthalene - 1 - carboxylic, naphthalene-2-carboxylic, diphenyl-2-, -3- and -4-carboxylic, isophthalic, terephthalic and diphenyl-2,2'-dicarboxylic acid, and heterocyclic acids, e.g. monocarboxylic acids of mono- or polynuclear heterocyclic 5- or 6-membered ring systems which may bear in particular nitrogen, oxygen or sulphur as hetero atoms, preferably heterocyclic compounds with only one hetero atom in the heterocyclic ring, e.g. thiophene-2- and -3-carboxylic acid and nicotinic acid. These acids may bear carbon bound substituents, e.g. halogen, in particular chlorine or bromine, as in chloroacetic, 2-chloropropionic and 2-, 3- and 4-fluoro-, -chloro-, -bromo- and -iodo- benzenecarboxylic acids; alkyl groups as in 2-methyl-butyric, 2-methyl-3-ethyl-pentanecarboxylic, 2-, 3- and 4-methylbenzenecarboxylic acids, the methylnaphthalenecarboxylic acids, quinaldinecarboxylic acid and 5-methylnicotinic acid; aralkyl radicals as in 5-benzyl-nicotinic acid; aryl radicals, e.g. phenyl radicals, as in phenylacetic, benzothiophene-2-carboxylic, benzthiophene-3-carboxylic and 5-phenylthiophene-2-carboxylic acids; nitro groups as in 2-, 3- and 4-nitrobenzoic acids; heterocyclic radicals, in particular mononuclear 5- or 6-membered rings containing nitrogen, oxygen or sulphur hetero atoms, as present in thiophene-2-acetic acid; acyl groups as in bromobenzophenone-carboxylic acids; and cyano, mercapto, tertiary amino, alkyoxy, ether, ester and organic sulphonyl groups. The reaction is of course applicable only with carboxylic acids that are stable at the reaction temperature, which excludes those acids that are decarboxylated at the reaction temperature.

The term "functional derivative" of a carboxylic acid, as used hereinbefore and hereinafter, is defined as a carboxylic acid derivative obtained by replacing the OH-group by a different group, the derivative reacting in the relevant reaction conditions in the same or similar manner as the carboxylic acid itself.

The salts, in particular the alkali metal salts and the earth alkali metal salts, of these carboxylic acids are particularly suitable functional derivatives, e.g. the sodium salts, the potassium salts, the calcium salts, the ammonium salts; further the anhydrides and halides, e.g. the chlorides, and in the aromatic series the corresponding trihalogenomethyl compounds.

Examples of functional acid derivatives are ammonium-2 - chlorobenzoate, acetic anhydride, 4 - nitrobenzoyl chloride and 1-methyl-4-trichloromethylbenzene.

Similarly as for the free acids also for their functional derivatives the reaction is applicable only with functional derivatives that are stable at the reaction temperature; so for instance the reaction is not applicable with nicotinic acid anhydride.

It is of special advantage to employ the amidosulphonic acid in amounts ranging from about 1 mole to 2.5 moles or more, particularly 1.5 to 2 moles per one equivalent of the carboxyl group or carboxyl derivative, while the optimum amounts of urea range from about 0.5 to 2 moles or more, particularly 1 to 1.5 moles.

Instead of being added as such, the amidosulphonic acid can, if preferred, be formed in the reaction mixture, for example by adding sulphuric acid and the extra amount of urea required for formation of the acid. The formation of amidosulphonic acid by reaction of urea and sulphuric acid is described, for example, in Helvetica Chimica Acta 29, 1438 (1946).

The reaction yielding the nitrile can be conducted in the presence or in the absence of an inert reaction medium. Thus carboxylic acid, amidosulphonic acid and urea can be dissolved or suspended in an inert organic compound of high boiling point which is liquid under the reaction conditions, e.g. benzophenone, or they can be melted in mixture with each other without the use of an inert medium. The reaction mixture is maintained at the appropriate temperature until the reaction is complete, which generally takes about 30 to 60 minutes at temperatures between 180° and 240° C. or, optimally, at 220–240° C.

On completion of the reaction the nitrile is isolated in the usual way and, if desired, purified. It can be purified by distilling off the other substances present in the mixture, or by extraction with an organic solvent of low boiling point, e.g. a chlorinated aliphatic hydrocarbon, in particular chloroform, trichlorethylene, perchlorethylene, cyclohexane or benzene, with subsequent distillation. Sometimes the impurities can be extracted with water.

In the following examples the parts are by weight and the temperatures in degrees centigrade.

EXAMPLE 1

A mixture of 60 parts of glacial acetic acid, 194 parts of amidosulphonic acid and 60 parts of urea is maintained for one hour at 220–230° with reflux. The acetonitrile thus formed is distilled off after this time.

In place of 60 parts of glacial acetic acid, 51 parts of acetic anhydride can be used with equally good results.

Thiophene-2-carboxylic acid nitrile can be produced in the same way starting from 128 parts of thiophene-2-carboxylic acid, and similarly pyridine-3-carboxylic acid nitrile from 143 parts of pyridine-3-carboxylic acid.

EXAMPLE 2

31.4 parts of 2-chlorobenzoic acid, 36 parts of amidosulphonic acid and 16.8 parts of urea are mixed in a vessel equipped with an air-cooled condenser and the mixture is reacted for 1 hour at an inner temperature of 220–230°. The 2-chlorobenzonitrile thus formed is distilled off under normal or reduced pressure and, if desired, is crystallized from petroleum ether.

In place of 2-chlorobenzoic acid, an equivalent amount of one of its alkali metal or ammonium salts or the anhydride of the acid can be employed with equally good success.

This procedure can be employed further for the production of naphthalene-1-carboxylic acid nitrile from naphthalene-1-carboxylic acid, of naphthalene-2-carboxylic acid nitrile from naphthalene-2-carboxylic acid, of 2-fluorobenzonitrile from 2-fluorobenzoic acid, and of phenylacetonitrile from phenylacetic acid.

EXAMPLE 3

A mixture of 196 parts of benzotrichloride, 194 parts of amidosulphonic acid and 80 parts of urea is reacted for one hour at 240° with reflux. The resulting benzonitrile is distilled off, shaken with a saturated potassium carbonate solution, dried and distilled again.

EXAMPLE 4

A mixture of 167 parts of isophthalic acid, 194 parts of amido-sulphonic acid and 120 parts of urea is maintained for one hour at 240°. On cooling the reaction mixture is shaken with chloroform and filtered. After removal of the chloroform by distillation, isophthalic acid nitrile is obtained.

Terephthalic acid nitrile is obtained when terephthalic acid is employed in place of isophthalic acid.

This same procedure is employable with equivalent amounts of other acids to yield the following compounds:

2-nitrobenzonitrile from 2-nitrobenzoic acid
3-nitrobenzonitrile from 3-nitrobenzoic acid
2-chloro-5-nitrobenzonitrile from 2-chloro-5-nitrobenzoic acid
3-chlorobenzonitrile from 3-chlorobenzoic acid
4-chlorobenzonitrile from 4-chlorobenzoic acid
2-bromobenzonitrile from 2-bromobenzoic acid
2-iodobenzonitrile from 2-iodobenzoic acid

EXAMPLE 5

A mixture of 46 parts of 1-chloro-2-trichloromethylbenzene, 36 parts of amidosulphonic acid and 16.8 parts of urea is reacted for one hour at 220–240° interior temperature and with stirring. On cooling, water at 70° is added, after which the mixture is allowed to cool further and then filtered. The product, 2-chlorobenzonitrile, is washed with aqueous ammonia solution, dried and distilled.

Similarly good results are obtained starting from 36 parts of 2-chlorobenzoyl chloride. This route can be employed to obtain 4-nitrobenzonitrile from 33.4 parts of 4-nitrobenzoic acid, for which product recrystallization from alcohol is a convenient method of purification. With 25 parts of nicotinic acid, nicotinic acid nitrile is formed, which is isolated by extraction with chloroform followed by distillation of the chloroform.

EXAMPLE 6

25.6 parts of cyclohexanecarboxylic acid, 36 parts of amido-sulphonic acid and 16.8 parts of urea are mixed and reacted in a vessel with reflux condenser for one hour at 220–230° interior temperature. On cooling the contents of the vessel are extracted several times with warm chloroform. After distilling off the chloroform, cyclohexanecarboxylic acid nitrile is obtained which can be purified by distillation. This procedure can be employed to produce benzonitrile from benzoic acid and 4-methylbenzonitrile, from 4-methylbenzoic acid.

EXAMPLE 7

12.3 parts of calcium 2-chlorobenzoate, 12.5 parts of amidosulphonic acid and 6 parts of urea are mixed in a vessel equipped with an air-cooled condenser and the mixture is heated for 1 hour at an inner temperature of 220–230°. The 2-chlorobenzonitrile thus formed is distilled off under normal or reduced pressure. The yield is 54% of theory.

The yields obtained with the operating procedures detailed in the foregoing examples are good to very good, considering the relatively moderate reaction conditions employed. Many nitriles are obtained in yields greater than 75% of theory and a good number, including bromo- and iodobenzonitrile, in yields equal to about 90% of theory.

EXAMPLE 8

14.5 parts of sodium nicotinate, 19.4 parts of amidosulphonic acid and 9.0 parts of urea are mixed in a vessel equipped with an air cooler condensor and the mixture is heated for 1 hour at an inner temperature of 220–230°. Then the reacted mixture was cooled, pulverized and then extracted thoroughly with benzene. The obtained product (3.9 parts) has a melting point of 49°. The melting point of the mixture of reaction product and pure nicotinic nitrile is also 49°.

Having thus disclosed the invention what I claim is:

1. In a process wherein a heterocyclic nitrile is produced by heating to reaction temperature a reaction mixture comprising urea and a heterocyclic carboxylic acid corresponding to the nitrile or a functional derivative of a heterocyclic carboxylic acid corresponding to the nitrile, said acid or derivative being stable at the reaction temperature, the improvement wherein at least about one mole of amidosulphonic acid per equivalent of carboxyl group on the carboxylic acid is in the reaction mixture, the amount of urea in said reaction mixture being at least about 0.5 mole per equivalent of carboxyl group in said acid.

2. A process according to claim 1 wherein the functional derivative of a carboxylic acid is an alkali metal salt, an alkaline earth metal salt, an anhydride or a halide.

3. A process according to claim 1 wherein the nitrile is produced from a heterocyclic carboxylic acid.

4. A process according to claim 1 which comprises preparing the amidosulphonic acid in the reaction mixture.

5. A process according to claim 1, wherein the reaction mixture is heated to a temperature between 180° and 240° C.

6. A process according to claim 2, wherein the reaction mixture is heated to a temperature between 220° and 240° C.

7. A process according to claim 1, wherein the heterocyclic carboxylic acid or its functional derivative contains only one hetero atom in the heterocycles.

8. A process according to claim 3, wherein the heterocyclic carboxylic acid is nicotinic acid.

References Cited

UNITED STATES PATENTS

| | | | |
|---|---|---|---|
| 2,322,914 | 6/1943 | Biggs | 260—465.2 |
| 2,339,672 | 1/1944 | Biggs | 260—465.2 |
| 2,444,828 | 7/1948 | Kaplan | 260—465.2 |
| 2,824,118 | 2/1958 | Frank et al. | 260—465.2 |
| 3,131,209 | 4/1964 | King | 260—465 |

OTHER REFERENCES

Kirsanov et al.: C. A., vol. 44 (1950), pp. 6384–6385.

HENRY R. JILES, Primary Examiner

M. A. M. CROWDER, Assistant Examiner

U.S. Cl. X.R.

260—329 R, 330.5, 465 B, 465.2